(12) United States Patent
Billyard et al.

(10) Patent No.: US 7,176,920 B1
(45) Date of Patent: Feb. 13, 2007

(54) COMPUTER GAMES APPARATUS

(75) Inventors: Adam Billyard, Guildford (GB); David Lau-Kee, Guildford (GB); Michael King, Guildford (GB); Philip Robertson, Greenwich (AU)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 09/411,389

(22) Filed: Oct. 4, 1999

(30) Foreign Application Priority Data

Oct. 28, 1998 (GB) .............................. 9823624

(51) Int. Cl.
*G06T 15/00* (2006.01)

(52) U.S. Cl. ........................ 345/427; 345/473; 463/63
(58) Field of Classification Search ................. 345/418, 345/427, 428, 581, 619, 473, 474; 463/63
See application file for complete search history.

(56) References Cited

U.S. PATENT DOCUMENTS

| | | | | | |
|---|---|---|---|---|---|
| 6,166,732 | A | * | 12/2000 | Mitchell et al. | ............. 715/733 |
| 6,300,936 | B1 | * | 10/2001 | Braun et al. | ................. 345/156 |
| 6,331,854 | B1 | * | 12/2001 | Rogers et al. | ............... 345/473 |
| 6,433,795 | B1 | * | 8/2002 | MacNaughton et al. | .... 345/738 |
| 6,478,680 | B1 | * | 11/2002 | Yoshioka et al. | ............. 463/43 |
| 6,697,869 | B1 | * | 2/2004 | Mallart et al. | ............... 709/231 |
| 6,753,870 | B2 | * | 6/2004 | Deering et al. | ............. 345/531 |

OTHER PUBLICATIONS

J.D. Foley, et al, "Computer Graphics Principles and Practice", Second Edition, pp. 806–812 (1990).
Chess Corner Home, Kasparov – Deep Blue, Game 1, May 3, 1997, pp. 1–2.*

15 Most Influential Games of all Time, Ultima Online (1997), Developer: Origin Systems, Publisher: Electronic Arts, GameSpot; printed Jan. 16, 2003, original publication date unknown.

15 Most Influential Games of all Time, Doom (1993), Developer: is Software, Publisher: id Software, GameSpot; printed Jan. 16, 2003, original publication date unknown.

15 Most Influential Games of all Time, Quake (1996), Developer: id Software, Publisher: id Software, GameSpot; printed Jan. 16, 2003, original publication date unknown.

Atlantic Unbound/Web Citations, The Atlantic Online (Sep. 18, 1997).

Blue Quake News (Apr. 2, 1997).

Quake DeveLS – Duel Patch for Quake 2 (Quake Spectator 1997).

* cited by examiner

*Primary Examiner*—Cliff N. Vo
(74) *Attorney, Agent, or Firm*—Fitzpatrick, Cella, Harper & Scinto (57) ABSTRACT

A computer games apparatus includes a server operable under the control of a computer program to generate and store data defining a 3D game environment. Objects within that environment can be moved and/or changed in response to signals received by the server from player terminals. Those signals may be transmitted via the Internet and/or other networks. The server renders the object data into data defining one or more views of the 3D environment, which data can then be processed into a broadcastable form for receipt by a plurality of observers. The performance of the apparatus is unaffected by the number of observers actually in receipt of the broadcast data.

47 Claims, 9 Drawing Sheets

COMPUTER GAMES APPARATUS

The present invention relates to the field of computer games and, more particularly, to computer games played in a three dimensional (3D) computer graphics environment by multiple users.

Recently, multiple player computer games have become popular. In these games, each player controls one or more objects (e.g. people, cars etc.) in a common 3D environment. For example, in one implementation of a multiple-player game, each player is equipped with a terminal device, such as a personal computer (PC), with Internet access, to communicate with a server implementing a game via the Internet. The server stores three-dimensional object data and each player sends signals to the server via his PC to control his object(s) within the 3D environment defined by the object data. The server processes the object data, including making changes thereto in accordance with the signals received from all of the players, and generates image data showing the current status of the 3D environment, which is sent to the players for displaying on their PC screens. The image data is generated by rendering the 3D object data from a viewing position defined for each player and which may be defined by that player. Image data for the viewing position defined for a player is then sent to that particular player.

In view of the popularity of these games, it has become of interest to some people to observe the playing of a game by a group of other players.

Figure 1:
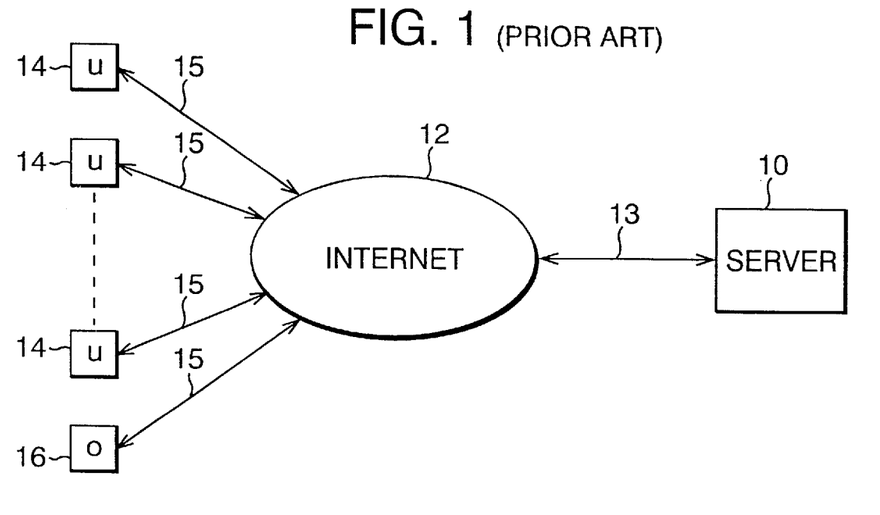
FIG. 1 is a schematic diagram of an example of a known computer system for the implementation of a computer game for a plurality of players and with the facility for the observation of the progress of the computer game by another party.

FIG. 1 shows an arrangement which allows a plurality of users to play a game while under observation by an observer. This arrangement does not form part of the present invention.

A server 10 is connected to the Internet 12 by an Internet connection 13. The server 10 is a computer on which is stored a computer program for implementation of a computer game suitable for use by a plurality of players. That is, server 10 stores object data defining a three-dimensional game environment containing objects to be controlled by players of the game and instructions defining how the object data is to be changed in response to signals from the players (which can be thought of as the game "rules"). A plurality of user terminals 14, such as PCs, are connected by Internet connections 15 to the Internet 12.

Each of the Internet connections 13, 15 is operable to allow the bi-directional transmission of data between the respective terminal 14 and the server 10. In that way, data can be passed from the terminal 14 to the server 10 to transmit player inputs to the game program, and data can be passed from the server 10 to the respective terminal 14 to update images displayed on the screen of a user terminal 14.

An observer terminal 16 is illustrated, also connected to the server 10 via connection 18 to the Internet 12. However, in this case, the operator of the observer terminal 16 takes no active part in the playing of the game embodied on the server 10 (that is, the observer cannot control any object in the stored object data).

Instead, the operator of the observer terminal 16 sends control commands to the server 10 to define a viewing position. In response to those signals, the server 10 renders the 3D object data from the defined viewing position and sends signals back to the observer terminal 16 defining images to be displayed.

When an observer is added to the game environment, the server must generate additional image data by rendering the object data from the viewing position defined for the observer. Such extra processing can cause players of the game to experience delays between registering inputs via their terminals and receiving confirmation of those inputs through images showing the changes being displayed at their terminals. This situation produces "latency" which affects the ability of a player to retain a real-time link with the game environment.

If latency at a player's terminal reaches unacceptable levels, the player will no longer be able to participate in the game effectively, since an image displayed on his screen at a particular point in real-time will relate to a game position a considerable period of time earlier than the time in question.

Furthermore, the addition of more observers to the network will further increase latency within the network, and removal of observers will reduce latency. Such increases and reductions in latency can be as distracting to actual players as the actual magnitude of the latency.

To address the problem of latency, the number of players and/or observers of a game is usually limited and/or the computer power of the server is increased. However, this approach can be inconvenient and expensive.

The present invention provides a computer graphics apparatus or method, in which data is stored defining a three-dimensional game environment and the data is changed in response to signals from users defining changes to objects in the environment, wherein data relating to at least one view of the game environment is generated and output for broadcast to potential observers.

By broadcasting a view of the game environment, the game can be received by any number of observers and the number of observers does not affect the speed of operation of the processor on which the game environment is defined.

It will be appreciated that the term "broadcasting" is to be interpreted not only in the sense of television and radio broadcasting, where a signal is generated and broadcast into the air, but also in the sense of transmission of signals along cables etc. from one transmitter to many potential recipients. Most broadcasting techniques do not require a broadcast signal to be addressed to particular recipients, and so any person in possession of appropriate equipment can obtain access to information carried on a broadcast signal by tuning to the frequency (or channel) of the signal. In the case of TV broadcasting, the broadcast signal is largely unaffected by the number of receivers of the broadcast signal; in the case of broadcasting across the Internet, provision is made by a broadcaster for a predetermined, but substantial, number of potential recipients, and that number is rarely reached except in the event of broadcast information being of particular public interest.

The rendering means is preferably operable to generate image data relating to a predefined number of different views of the game environment. In that way, a plurality of images, each from a different viewing position and/or direction, of the game environment can be broadcast to potential recipients, and the actual image to be viewed by a recipient can be selected by that recipient from those broadcast.

Embodiments of the present invention will now be described, by way of example only, with reference to FIGS. 2 to 8 of the accompanying drawings. In the drawings.

Figure 2:
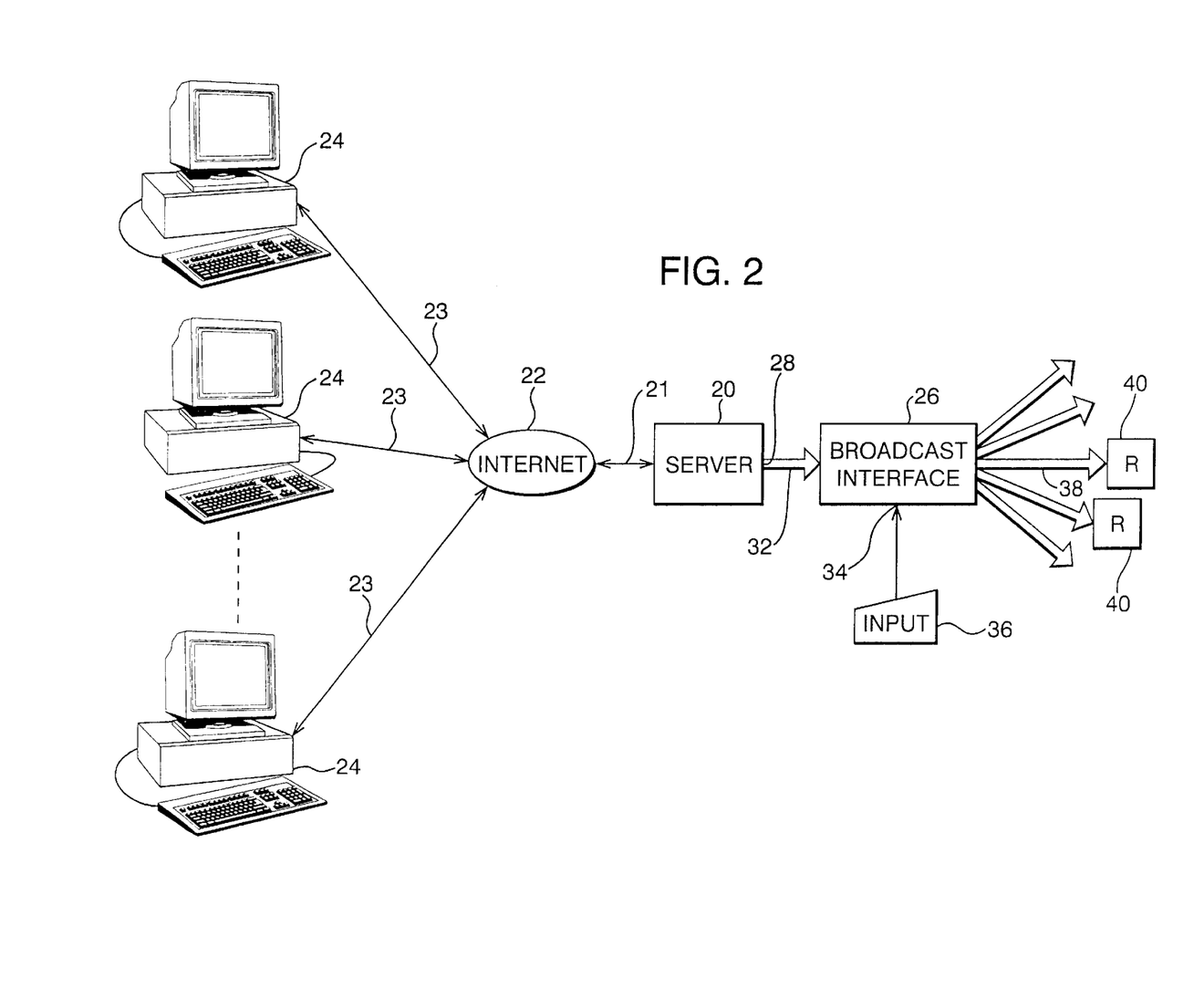
FIG. 2 is a schematic diagram showing a computer network in a first embodiment of the present invention.

In a first embodiment, a computer network, as illustrated in FIG. 2, comprises a network server 20, which is connected to the Internet 22 by an Internet connection 21. The server 20 is under the control of software designed to implement a multiple player game, and has stored therein object data defining a 3D game environment and instructions on how the object data is to be changed in response to signals from players. Server 20 receives signals from players of the game sent via the Internet 22, modifies the stored object data in response thereto, and transmits data defining images and sound back to the players via the Internet to show the current status of the object data (game). These operations will be described in more detail below.

A plurality of user terminals 24 are connected to the Internet 22 by Internet connections 23. Each of the user terminals 24 comprises a personal computer 24 having access to the Internet. Alternatively, one or more of the user terminals 24 can be implemented in other forms, such as a television combined with a set-top box for processing and Internet access. Each of the user terminals 24 is under the control of software which allows the user of the terminal to send instructions to the server 20 defining how to change one or more objects in the game environment and to receive data defining images and sound from the server 20.

The computer network further comprises a broadcast interface 26, which receives video and audio signals from the server 20, processes them, and broadcasts data defining video images on a number of different broadcast channels 38. The server 20 and broadcast interface 26 can be located remotely of each other.

More particularly, the server 20 has an output port 28, and the broadcast interface 26 has a data input port 30, between which a data channel 32 is defined. In this embodiment, the data channel 32 comprises a hard-wired parallel connection for transfer of data along the channel in real time. However, other forms of data channel are possible. For example, the data channel may be defined by an output device, such as a disk drive, connected to the server 20 and an input device, such as another disk drive, connected to the broadcast interface 26, by which data can be stored on a storage medium, such as a disk, at the disk drive of the server 20, and then transferred to the broadcast interface 26 through the disk drive thereof (transfer of data in this manner being in non-real time). The data passed along the data channel 32 defines a series of video signals defining images of the 3D object data from a number of different viewpoints and audio signals corresponding to each series of images. In this embodiment, the viewpoints for the images sent from server 20 to broadcast interface 26 can be defined in the software instructions implementing the game stored on server 20, or can be specified by a system administrator operating the server 20.

The broadcast interface 26 has a control input port 34, to which is connected an input device 36. The input device 36 may comprise a keyboard and/or a position sensitive input device such as a mouse, tracker ball, or a digitiser tablet and stylus etc. In combination therewith or in the alternative, the input device 36 may also comprise a video production desk or the like. By use of the user input device 36, a producer can create a broadcastable signal comprising a sequence of edited portions of the image signals received from server 20.

The broadcast interface 26 broadcasts data on a plurality of channels 38, for reception by one or more receivers 40. In this embodiment, broadcast interface 26 transmits image and sound data on a plurality of digital television channels through the atmosphere. However, one or more of the channels could comprise cabling. One or more of the channels could comprise at least one relay station which is adapted to receive signals, to refine those signals such as by amplification and filtering, and to retransmit refined signals onward. Each channel transmits data for a respective different view of the game.

Each receiver 40 can tune to one of the broadcast channels and hence select the viewpoint from which the game is to be observed.

The server 20 will now be described further.

Figure 3:
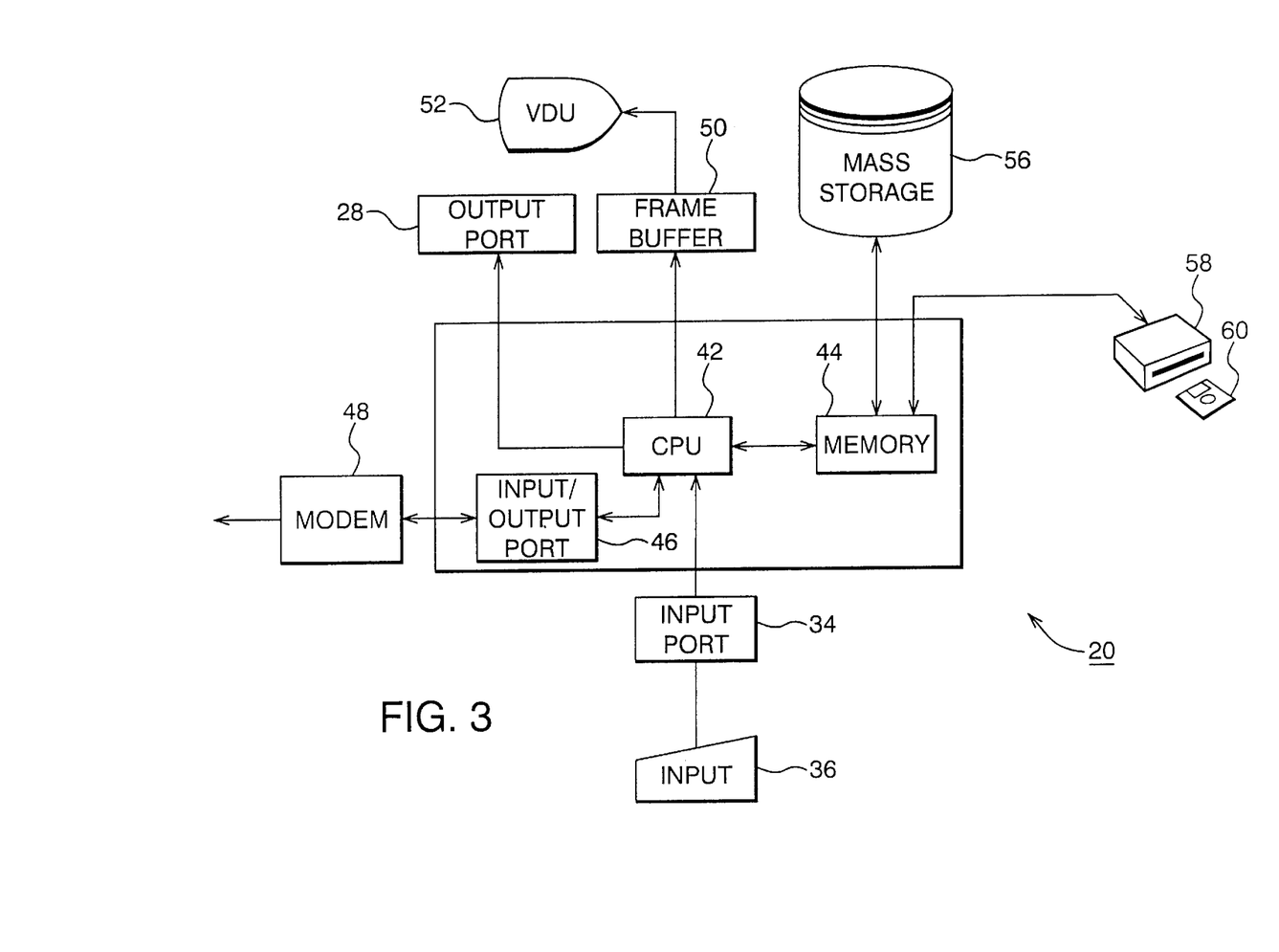
FIG. 3 is a schematic diagram of the network server of the computer network illustrated in FIG. 2.

As illustrated in FIG. 3, the server 20 comprises a central processing unit (CPU) 42, to which is coupled a memory 44. The memory 44 has coupled therewith a mass storage device 56 for storage of data of which instant access is not required, and a disk drive 58 for receiving a storage medium, such as a disk 60, from which data can be transferred to the memory 44 and to which data can be transferred from the memory 44. The software, previously described as implementing the multiple-player game, can be input into the server 20 via disk drive 58 by means of a storage medium, such as a disk, or by downloading from a database, for example via the Internet. The software is stored in memory 14 and routines thereof can be accessed by the CPU 42. The memory 44 defines the three-dimensional object data such that the positions of all objects in the game environment are tracked.

Also coupled with the CPU 42 is an input/output port 46. A modem 48 is connected to the input/output port 46. The modem 48 is configured to connect to a telephone network (not shown) and the mass storage device 44 further has software appropriate to the establishment of a connection to the Internet via the modem 48 and the telephone network.

The modem 48 allows the CPU 42 to receive signals from players at terminals 24. The CPU 42 acts on those control signals in accordance with the software defining the game to make changes to the game environment in memory 44, and sends data defining images to be displayed at user terminals 24, via modem 48 and the Internet 12 to the appropriate terminals 24. In this embodiment, server 20 sends data defining each pixel of an image. However, other types of data may be sent. For example, data defining changes to an image may be sent.

A frame buffer 50 is also provided, connected to the CPU 42. The frame buffer 50 is used to store frames of video images generated by the CPU for output to a visual display unit (VDU) 52 connected therewith, so as to display images to an operator (system administrator) of server 20. The video images are preferably representative of views of the game as are displayed at the user terminals, and may also include a region allowing system commands and responses to be displayed. An input device 36 is connected via a control input port 34 of the CPU 42, to enable a system administrator to input system commands to the network server 20. As noted above, those commands and any responses thereto can be displayed on the VDU 52.

The CPU 42 further has connected therewith an output port 28, as previously noted with reference to FIG. 2, for outputting data to broadcast interface 26.

It will be appreciated that, since the server 20 includes components standard to a personal computer, the server can comprise a personal computer. Moreover, the server 20 can also comprise one of the user terminals 24.

Figure 4:
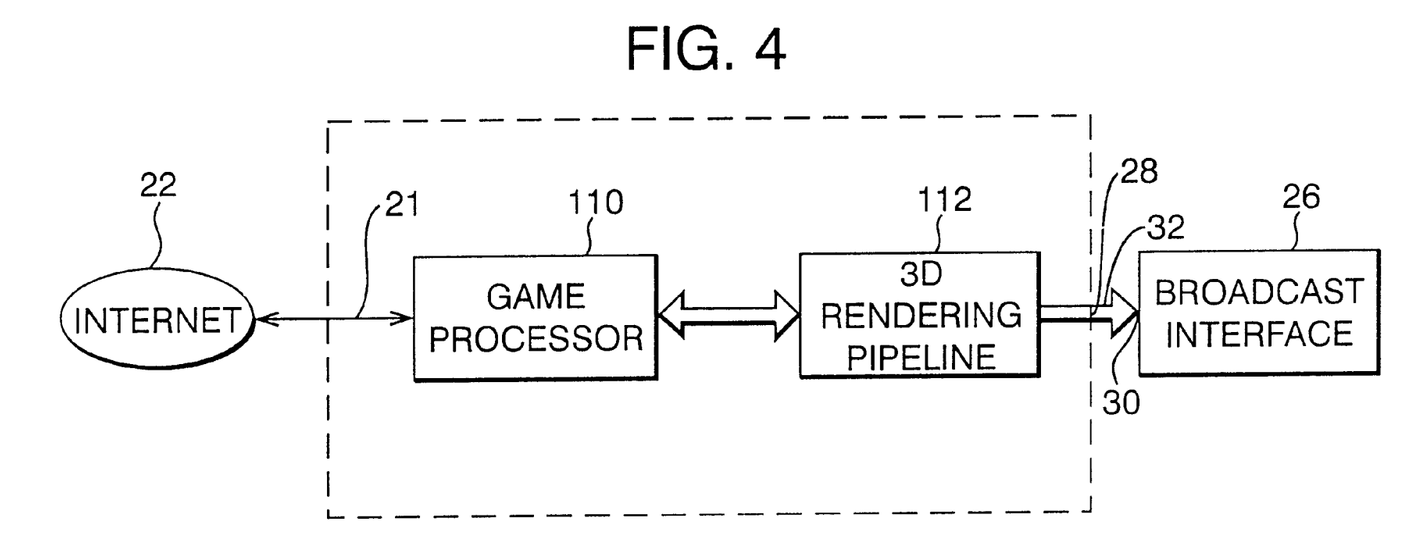
FIG. 4 is a schematic block diagram of operational modules of the network server illustrated in FIG. 3.

With reference to FIG. 4 of the drawings, in use, server 20 is programmed to provide functional units which include a game processor 110 and a rendering pipeline 112.

The game processor 110 is adapted to receive control signals from, and send data signals to, user terminals 24 in the playing of a multi-player computer game. The game processor 110 stores the object data to describe the three-dimensional game environment, including objects whose positions can be controlled by the players of the game using their user terminals 24. The object data, representing playing positions and the game environment, can be changed by the game processor 110 acting in accordance with control signals from the various players operating user terminals 24. In return, the game processor 110 responds by sending signals to each user terminal 24 defining a video image to be observed by the player at that user terminal 24. This allows the player at a user terminal 24 to interact with the game processor 110.

The rendering pipeline 112 is of standard form, for example as described in "Computer Graphics Principles and Practice" by Foley, Van Dam, Feiner and Hughes, 2nd edition Addison-Wesley Publishing Company, ISBN 0-201-12110-7 pages 806 to 812.

The game server 110 and the 3D rendering pipeline 112 are connected so that object data defining the playing environment can be read by the 3D rendering pipeline 112. The rendering pipeline 112 converts the object data relating to the three-dimensional playing environment into image data representing a plurality of views defined at viewpoints within the playing environment. Views are defined at viewpoints selected by each of the players (which may be limited by the game rules to be the position of the player's character in the 3D game environment so that each player effectively sees the same thing as his character), and further views are defined at a plurality of other locations in the game environment. These further views can be predefined by the software controlling the game, or they can be determined through the input of system commands by the system administrator via input device 36. These further views may be fixed or may vary.

Image data defining the view selected by each player is returned from the rendering pipeline 112 to game processor 110 for transmission to the user terminals 24.

Image data defining the further views and also all of the views defined by the players is delivered to the output port 28 of the server 20, and from there via the data channel 32 to the input port 30 of the broadcast interface 26. In this embodiment, data defining each pixel of each image is output from server 20 to broadcast interface 26. However, other forms of data may be transferred. For example, data defining the changes to a previous image in the sequence may be sent to reduce the amount of data being transformed.

It will be understood that the delivery of image data to the broadcast interface 26 need not take place in real time. For example, if "live" broadcasting of video signals relating to the image data is not required, the image data can be sent to the disk drive 58 and written to a disk 60, which can then be transferred and loaded into the broadcast interface 26.

Figure 5:
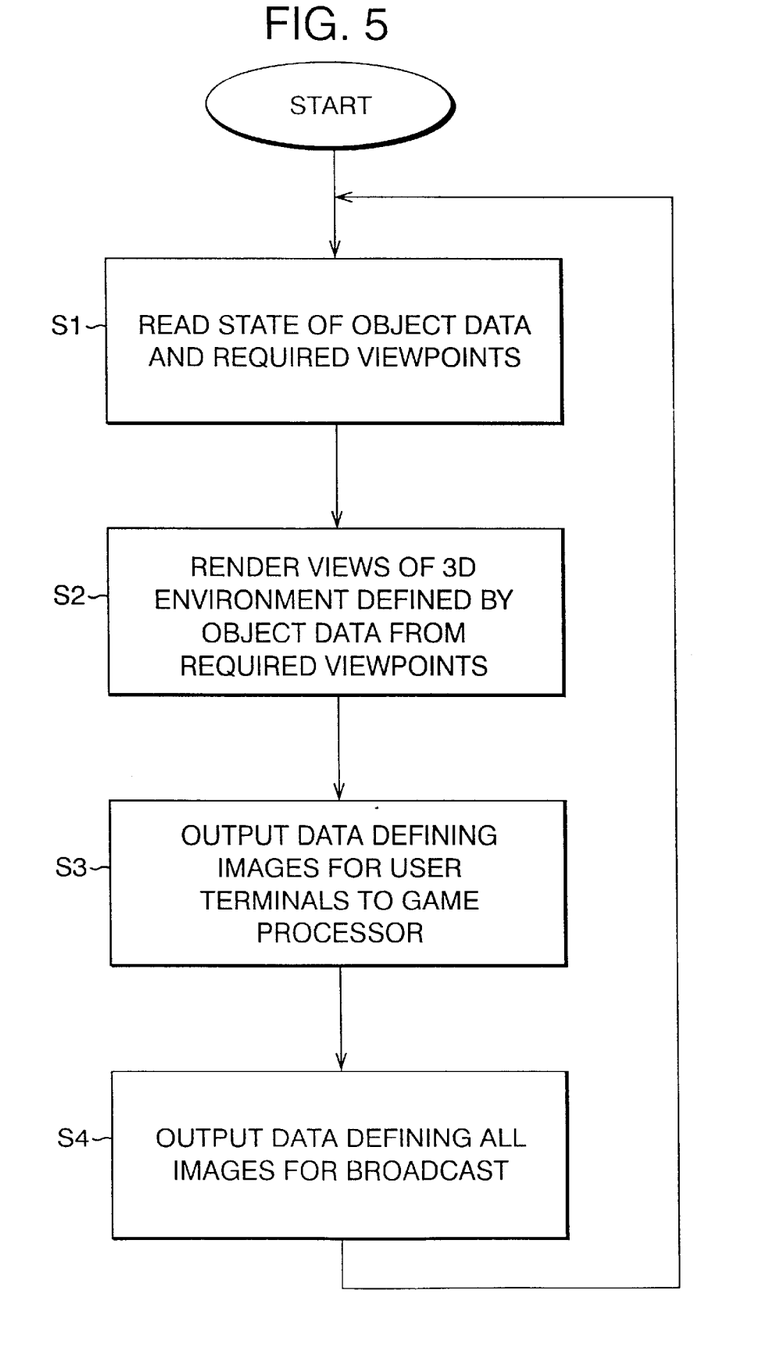
FIG. 5 is a flow diagram showing functions of the 3D rendering pipeline illustrated in FIGS. 3 and 4.

FIG. 5 illustrates a series of steps which describe the operation of the 3D rendering pipeline 112.

It will be noted that the series of steps comprises an endless loop. This is because the steps are carried out as long as the game is in operation, and is not affected by interrupts from external sources. In a first step S1, the 3D rendering pipeline 112 refers to the object data defined by the game server 110 and the viewpoints from which views are to be rendered. Once that information has been acquired, in step S2 the various views of the 3D environment defined by the object data are rendered by the 3D rendering pipeline 112 from the required viewpoints.

Then, in step S3, the data defining the images for display at user terminals is sent back to the game processor 110 from where they are sent via the Internet connections to the user terminals 24.

Finally, in step S4, the data defining all of the images produced in the rendering pipeline 112 is output to the output port 28 of the network server 20, from where it is sent to the input port 30 of the broadcast interface 26.

Once these steps have been completed, the procedure returns to the first step S1, and is repeated. In this embodiment, the procedure is repeated every 25 milliseconds, thereby producing 40 sets of new views every second, but other frame rates are, of course, possible.

The components of a user terminal 24 will now be described.

Figure 6:
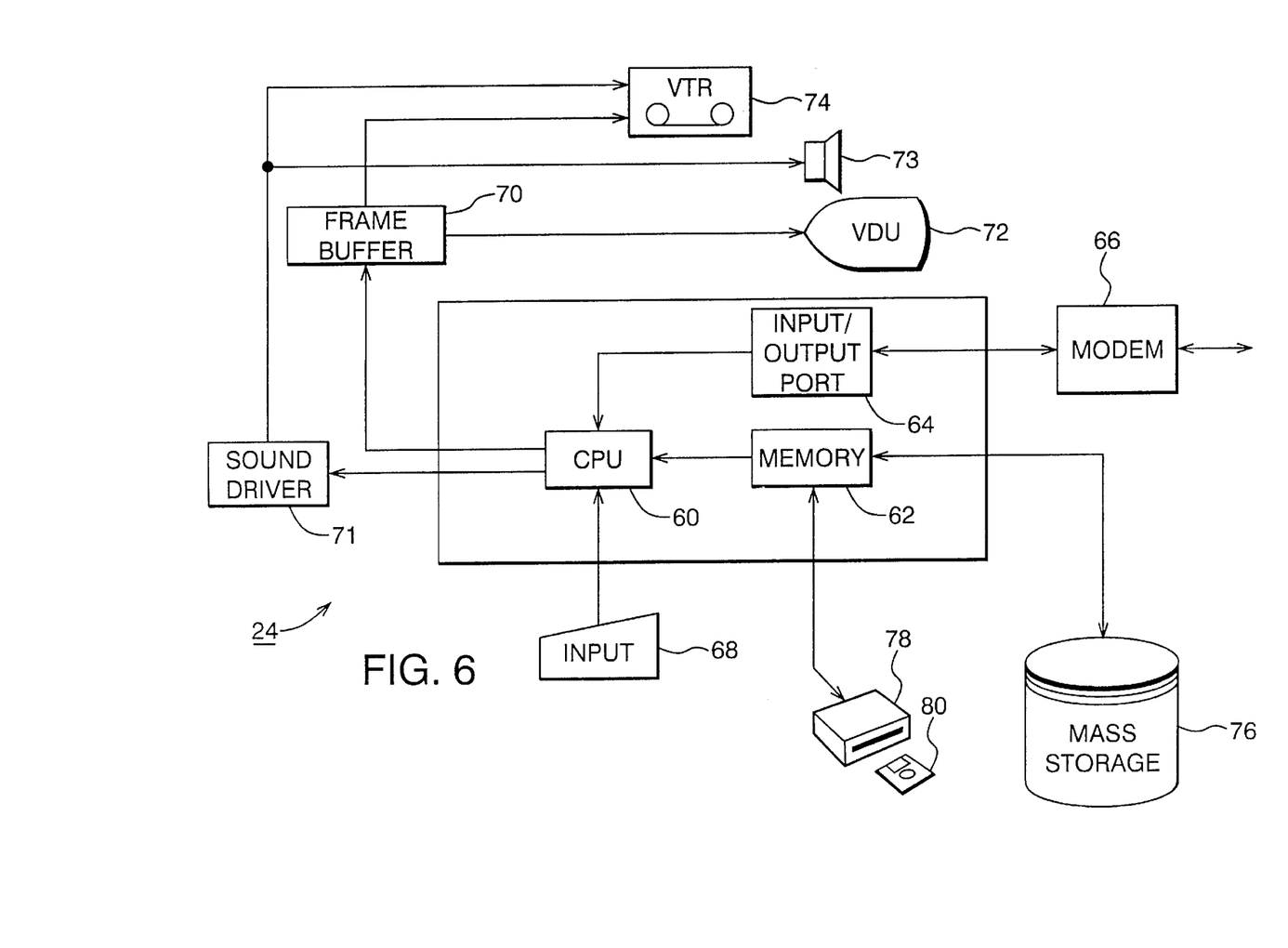
FIG. 6 is a schematic diagram of a user interface in the computer network illustrated in FIG. 2.

As illustrated in FIG. 6, a user terminal comprises a personal computer 24, comprising a central processing unit (CPU) 60 coupled with a memory 62. The memory 62 has coupled therewith a mass storage device 76 and a disk drive 78. The mass storage device enables the storage of data therein which need not be available for instant access by the CPU 60, and the disk drive 78 is adapted to receive a disk 80 for exchanging data between the disk 80 and the memory 62. The mass storage device 76 includes software implementing a user interface on the terminal 24 for interaction between the player and the user terminal 24.

Also coupled with the CPU 60 is an input/output port 64, coupled with a modem 66 to allow access to the Internet via a telephone line (not shown). The CPU 60 has an input device 68 connected thereto, the input device 68 comprising a keyboard, and/or a position tracking device as described previously. The CPU 60 is connected to a frame buffer 70, which stores at least one frame of a video signal therein for output to a visual display unit (VDU) 72 where an image can be displayed, or to a video tape recorder 74 where a video signal can be recorded for playback later. A sound driver 71 is connected to the CPU 60, to receive signals containing data defining audio signals. The sound driver 71 is connected to the video recorder 74 for recording of the audio signals, and to a loudspeaker 73 associated with the visual display unit 72, for playback of audio signals in synchronisation with video signals displayed on the visual display unit 72.

The user terminal 24 receives image data and associated audio signals via the Internet from the game processor 110 of server 20, and converts that data into image frames and audio signals. The frames are sent to the frame buffer 70 and the audio signals are sent to the sound drive 71. Moreover, the player using a user terminal 24 can observe the image displayed on the VDU 72, and make inputs via the keyboard 68. Those inputs can be representative of commands for controlling the game, and so the inputs are converted by the CPU 60 into control signals which are sent along the Internet to the game processor 110.

The components of the broadcast interface 26 will now be described.

Figure 7:
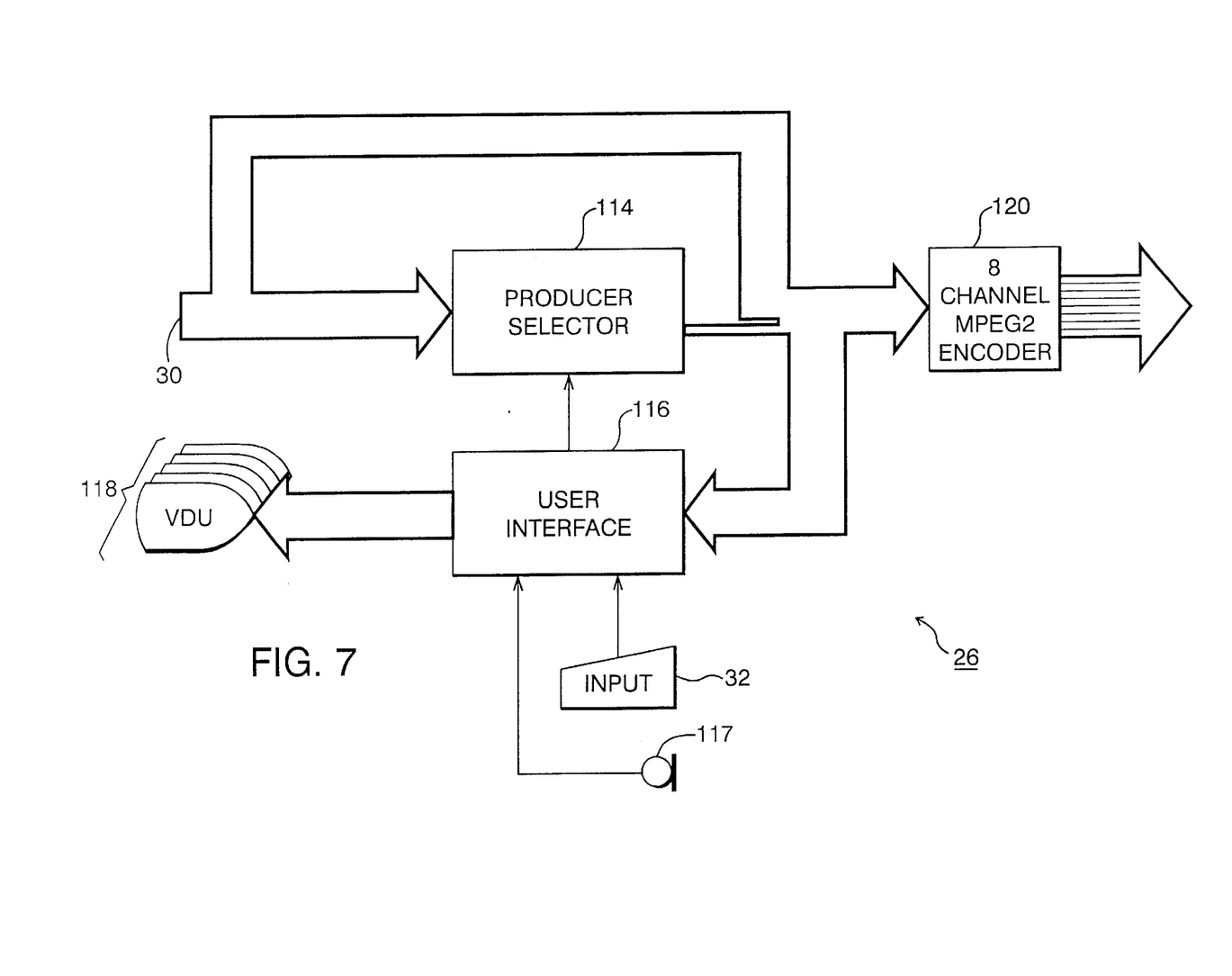
FIG. 7 is a schematic block diagram of a broadcast interface of the computer network illustrated in FIG. 2.

As illustrated in FIG. 7, the broadcast interface 26 includes a producer selector 114 and a user interface 116.

The producer selector 114 and user interface 116 are arranged to enable an operator (producer) to select images to be broadcast from the available views (and therefore perform the functions of a conventional TV image data selector as operated by a producer when images from a number of cameras are available).

More particularly, producer selector 114 receives all of the image data from the input port 30 for all views generated by the server 20, and outputs image data for a single stream of images selected from the available views. The producer selector 114 is connected to the user interface 116, and control signals generated in the user interface are operative to determine the selection of the images to be output from the producer selector 114.

The user interface 116 has connected thereto an input device 32, such as a video production desk, of conventional type. The original images received from the input port 30 and the images output from the producer selector 114 are fed to the user interface 116. The user interface 116 processes all of the image data to display the images on an array of visual display units 118, each display unit displaying the images for one viewing position and one of the display units displaying the images selected by the operator.

In that way, the producer selector 114 can be operated to select different views of the 3D game environment and, with sufficient skill of the operator, a meaningful sequence of "camera angles" (views) of the 3D playing environment can be generated, thereby emulating a sequence of camera angles as might be provided in a real television production.

It will be appreciated that the array of visual display units 118 may be replaced by a simple visual display unit displaying an image comprising a plurality of regions, each region containing an image otherwise displayed on one of the array of visual display units 118 illustrated in FIG. 7.

Also connected to the user interface 116 is a microphone 117, through which a commentary can be added to the video signals. For instance, if the game is based on a sport or similar activity, a television personality connected with that sport could be engaged to provide comment on the progress of the game. In that way, commentary may be provided in a local language to a game actually played in a foreign country. The commentary may be provided as an overlay over existing audio signals attached to the image data, or in replacement thereof.

The images received from the input port 30 and the images output from the producer selector 114 are fed to a MPEG2 encoder 120, which generates compressed video signals.

Each of the compressed video signals is then broadcast by satellite communication and/or cable and/or electromagnetic radiation transmission on a separate digital television channel, so that they can be received by any member of the public anywhere in the world.

In this embodiment, for illustration purposes, the rendering pipeline 112 produces image data for seven different viewing positions, and the image data for each of these positions is broadcast on a separate channel. In addition, image data for images selected by the producer from the seven different viewing positions is produced by producer selector 114 and broadcast on an eighth channel. Accordingly, in this embodiment, MPEG2 encoder 120 is an eight channel encoder.

Figure 8:
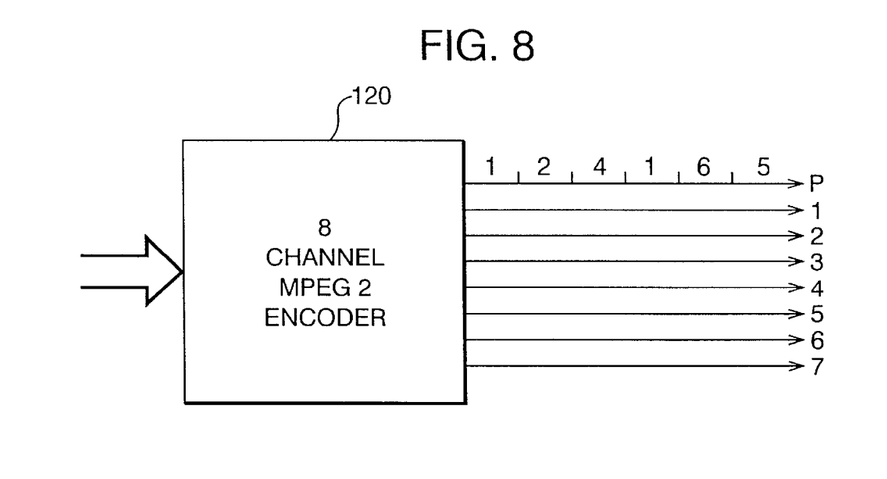
FIG. 8 is a schematic block diagram of a data encoder of the broadcast interface illustrated in FIG. 7.

The structure of the channels of data output by the MPEG2 encoder 120 can be more clearly observed in FIG. 8. That figure shows the input of image data to the encoder 120, and the output of eight channels, referenced as channels 1 to 7 and channel p. Channel p comprises the producer selected channel, being a stream in real time selected from portions of the signals on the other seven channels.

Figure 9:
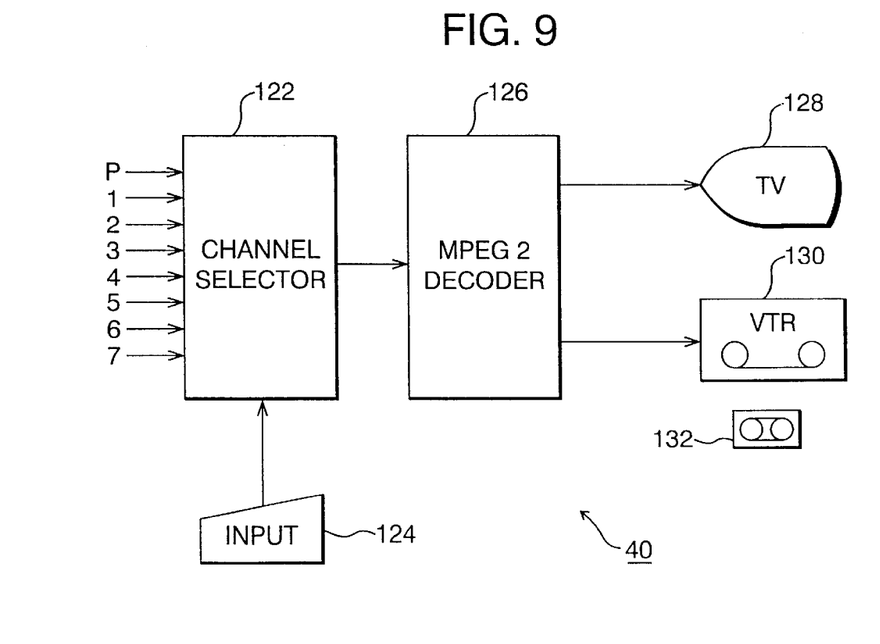
FIG. 9 is a schematic block diagram of a receiver for use with the computer network illustrated in FIG. 2.

FIG. 9 shows a receiver 40 for receiving the channels output by the eight channel MPEG2 encoder. In practice, the receiver is operable to receive digital television signals in general. The receiver includes a channel selector 122, which receives the eight channels p and 1 to 7. The channel selector receives signals from an input device 124 such as a remote control unit, and selects one of the eight signals for viewing. The selected channel is output to an MPEG2 decoder 126, which produces a signal adapted to be received by a television receiver 128. The channel selector 122 and the MPEG2 decoder 126 can be incorporated into a set top box for domestic purposes.

The output of the MPEG2 decoder 126 is connected to a television 128 and to a video tape recorder (VTR) 130. The VTR 130 can be used to record the output, which is a video/audio signal, on a video tape 132. Further recordings may then be made by making recordings directly or indirectly from tape 132.

In accordance with the foregoing, a multi-player game can be played in a three-dimensional playing environment, and the state of the game can be viewed by any number of observers from one of a selection of viewpoints, without influencing the speed at which the game can be played. Moreover, a commentary may be added, for reception by an observer.

Figure 10:
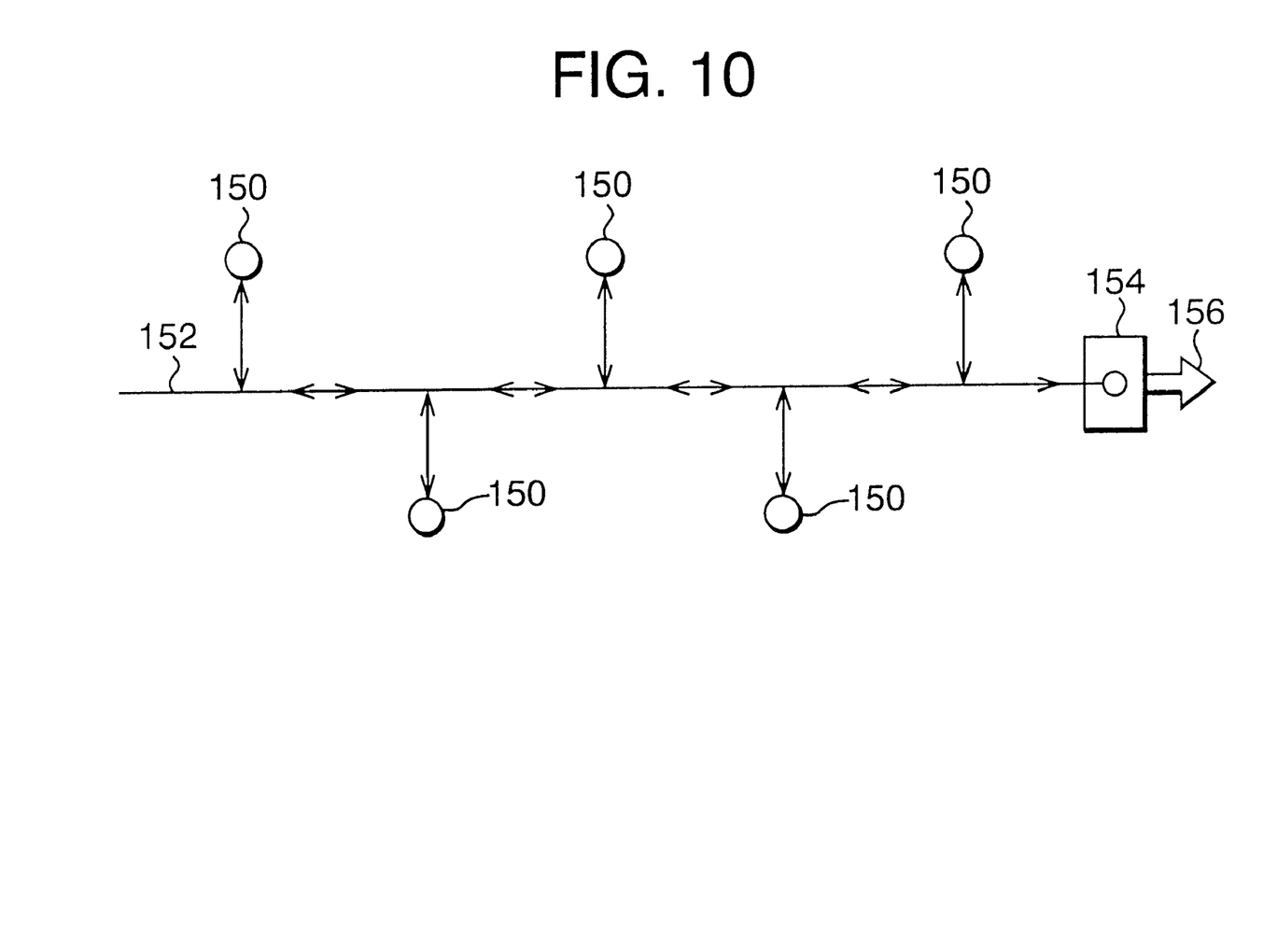
FIG. 10 is a schematic diagram of an alternative embodiment of the present invention.

FIG. 10 shows a computer network in a second embodiment. The network comprises five terminals 150. Each terminal 150 consists of a personal computer, and each terminal 150 is connected to a communication channel 152, such as a LAN etc. A broadcast interface 154 is also connected to the communication channel 152, and monitors communication between the terminals 150 on the channel 152.

In use, each terminal 150 is provided with its own copy of the software as stored on server 20 in the first embodiment, that is object data defining the three-dimensional game environment and processor implementable instructions defining how the object data is to be modified in response to player instructions. Inputs made by a user of a terminal 150 cause changes to be made to the object data stored on that terminal (rather than the object data stored on a server, as in the first embodiment). Those changes are communicated to all of the terminals 150 in the network, by means of the communication channel 152, and the object data stored locally on those terminals are changed accordingly. The broadcast interface 154 also has a copy of the object data, which it updates in accordance with the signals received from all of the terminals 150.

The broadcast interface 154 includes a rendering pipeline that renders object data into image data from predetermined viewpoints. The image data is then broadcast to potential recipients along a broadcast channel 156.

In the second embodiment, it should be noted that the addition of further terminals to the network may reduce the efficiency of the communication channel 154. However, since data is broadcast to observers, the actual number of observers is not relevant to the effectiveness of the communication between the terminals 150 via the communication channel 152.

A third embodiment of the invention will now be described. The third embodiment is the same as the first embodiment, but with the following changes.

In the third embodiment of the invention, the network server 20 has stored therein object data defining a 3D game environment and instructions on how the object data is to be changed in response to signals from players, as in the first embodiment. However, in addition, each of the user terminals 24 has stored therein a copy of the object data defining the 3D game environment. Server 20 receives signals from players of the game at terminals 24 sent via the Internet 22, modifies the object data stored in the server in response thereto, and transmits data defining changes to the stored object data back to the user terminals 24 (rather than image data as in the first embodiment). Upon receipt of the change data from the server 20, each user terminal 24 updates the copy of the object data stored at the terminal accordingly. Each user terminal then renders an image from the object data stored at the terminal from a selected viewpoint within the 3D game environment. For each player, the position and direction of the view within the 3D game environment is transmitted back to the server 20, which then constructs data defining images at those viewpoints (and other viewpoints) so that data can be broadcast by the broadcast interface 26. Of course, if the views of the players are not to be broadcast, then it is unnecessary for each terminal 24 to send information to the server defining the viewing parameters of the player at the terminal.

What is claimed is:

1. A system for playing a computer game, comprising a plurality of player apparatus for the input of user instructions and at least one game processing apparatus storing data defining a 3D game environment, wherein the player apparatus and the game processing apparatus are connected and information is transferred to enable each player to view the status of the 3D game environment and to control one or more objects therein, and wherein the system further comprises broadcast means for broadcasting data defining at least one view of the 3D game environment for receipt by a plurality of observers, wherein said broadcasting means is operable to broadcast data defining a view of the 3D game environment different from the view or views thereof available to each player.

2. A system according to claim 1, wherein there is a game processing apparatus having the form of a server to which each player apparatus is connected, and wherein object control signals are sent from the player apparatus to the game processing apparatus and information defining the status of the game environment is sent from the game processing apparatus to the player apparatus.

3. A system according to claim 1, wherein each player apparatus includes a game processing apparatus, and wherein each player apparatus sends information to the other player apparatus defining changes made to the game environment by the player at the apparatus which sends the information.

4. A system according to claim 1, wherein the broadcast means is arranged to address the data defining the at least one view of the 3D game environment to particular observers and to broadcast the data thereto.

5. A method of operating a computer graphics system to effect a computer game, which graphics system comprises a plurality of player apparatus for the input of user instructions and at least one game processing apparatus storing data defining a 3D game environment, the method comprising the steps of:

transferring information between the player apparatus and the game processing apparatus to enable each player to view the status of the 3D game environment and to control one or more objects therein; and broadcasting data defining at least one view of the 3D game environment for receipt by a plurality of observers to enable the observers to view the game, wherein the broadcasting step includes broadcasting on a television channel.

6. A method according to claim 5, performed in a graphics system including a game processing apparatus having the form of a server, the method including sending object control signals from the player apparatus to the game processing apparatus and sending information defining the status of the game environment from the game processing apparatus to the player apparatus.

7. A method according to claim 5, performed in a computer graphics system in which each player apparatus includes a game processing apparatus, the method including exchanging information between the player apparatus defining changes made to the game environment in response to actions of a player at a particular player apparatus.

8. A method according to claim 5, wherein the broadcasting step includes broadcasting on a channel defined at least in part by a communication network.

9. A method according to claim 8, wherein the broadcasting step includes broadcasting on a channel defined at least in part by the Internet.

10. A method according to claim 5, wherein the broadcasting step includes broadcasting in substantially real time as the computer game is played.

11. A method according to claim 5, performed in a computer graphics system in which each player apparatus includes a game processing apparatus storing data defining the 3D game environment, and in which there is a game processing apparatus having the form of a server to which each player apparatus is connected, the method including the steps of:

sending instructions from each player apparatus to the server to change the 3D game environment stored therein in accordance with inputs from a user at the player apparatus; and sending data from the server defining the status of the game environment to each player apparatus.

12. A method according to claim 5, wherein the broadcast data defining the at least one view of the 3D game environment is addressed to particular observers.

13. A computer graphics apparatus, comprising:

storage means for storing data defining a 3D game environment;

game processing means for amending stored data in dependence upon player control of objects in the game environment;

means for generating broadcast data defining at least one view of the game environment; and broadcasting means operable to broadcast the broadcast data, wherein the game processing means is operable to generate and output data defining a plurality of views of the game environment, the plurality of views comprising a respective view of the game environment for each player.

14. Apparatus according to claim 13, wherein the game processing means is operable to generate and output data defining change to the game environment for receipt by each player.

15. An apparatus according to claim 13, wherein the broadcasting means is operable to address the broadcast data to particular receivers and to broadcast the broadcast data thereto.

16. A computer graphics apparatus, comprising:

storage means for storing data defining a 3D game environment;

game processing means for amending stored data in dependence upon player control of objects in the game environment;

means for generating broadcast data defining at least one view of the game environment; and broadcasting means operable to broadcast the broadcast data, wherein the means for generating broadcast data is operable to generate broadcast data defining a plurality of views of the game environment for broadcast.

17. Apparatus according to claim 16, wherein the game processing means is operable to generate and output data defining change to the game environment for receipt by each player.

18. An apparatus according to claim 16, wherein the broadcasting means is operable to address the broadcast data to particular receivers and to broadcast the broadcast data thereto.

19. A computer graphics apparatus, comprising:

storage means for storing data defining a 3D game environment;

game processing means for amending stored data in dependence upon player control of objects in the game environment;

means for generating broadcast data defining at least one view of the game environment; and broadcasting means operable to broadcast the broadcast data, wherein the broadcasting means includes data compression means operable to convert the broadcast data into a compressed format.

20. Apparatus according to claim 19, wherein the data compression means is operable to convert data into an MPEG format.

21. An apparatus according to claim 19, wherein the broadcasting means is operable to address the broadcast data to particular receivers and to broadcast the broadcast data thereto.

22. Apparatus according to claim 19, wherein the game processing means is operable to generate and output data defining change to the game environment for receipt by each player.

23. A method of operating a computer graphics apparatus in which is stored data defining a 3D game environment, comprising the steps of:

updating the stored date in response to received signals defining player control of objects in the game;

generating broadcast data defining at least one view of the game environment; and broadcasting the broadcast data for receipt by a plurality of game observer apparatus, wherein data defining a respective view of the game environment is generated and output to each respective player.

24. A method according to claim 23, wherein data defining change to the game environment is generated and output to each respective player.

25. A method according to claim 23, wherein the broadcast data is addressed to particular game observer apparatus.

26. A method of operating a computer graphics system to effect a computer game, which graphics system comprises a plurality of player apparatus for the input of user instructions and at least one game processing apparatus storing data defining a 3D game environment, the method comprising the steps of:

transferring information between the player apparatus and the game processing apparatus to enable each player to view the status of the 3D game environment and to control one of more objects therein; and broadcasting data defining at least one view of the 3D game environment for receipt by a plurality of observers to enable the observers to view the game, wherein the broadcast data defines a view of the 3D game environment different from the view or views thereof available to each player.

27. A method according to claim 26, performed in a graphics system including a game processing apparatus having the form of a server, the method including sending object control signals from the player apparatus to the game processing apparatus and sending information defining the status of the game environment from the game processing apparatus to the player apparatus.

28. A method according to claim 26, performed in a computer graphics system in which each player apparatus includes a game processing apparatus, the method including exchanging information between the player apparatus defining changes made to the game environment in response to actions of a player at a particular player apparatus.

29. A method according to claim 26, wherein the broadcasting step includes broadcasting on a channel defined at least in part by a communication network.

30. A method according to claim 26, wherein the broadcasting step includes broadcasting in substantially real time as the computer game is played.

31. A method according to claim 26, performed in a computer graphics system in which each player apparatus includes a game processing apparatus storing date defining the 3D game environment, and in which there is a game processing apparatus having the form of a server to which each player apparatus is connected, the method including the steps of:

sending instructions from each player apparatus to the server to change the 3D game environment stored therein in accordance with inputs from a user at the player apparatus; and sending data from the server defining the status of the game environment to each player apparatus.

32. A method according to claim 26, wherein the broadcast data defining the at least one view of the 3D game environment is addressed to particular observers.

33. A method performed in a computer graphics processing apparatus of processing data defining a three-dimensional computer graphics game, the method comprising the steps of:

processing stored game data in accordance with instructions received from a plurality of game players to control objects in the game; and processing the stored game data to generate a sequence of images of the progressing game from at least one view, and broadcasting the image data as a one-way, non-interactive conveyance of data for receipt by a variable number of observer apparatus.

34. A method according to claim 33, wherein the broadcast image data is addressed to a particular observer apparatus.

35. A computer graphics processing apparatus, comprising:

a data store for storing game data defining a three-dimensional computer graphics game;

a game engine operable to process the stored game data in dependence upon received signals defining control of objects in the game by a plurality of players;

an image data generator operable to process the stored game data to generate at least one sequence of images conveying the progress of the game as it is played by the players; and a data broadcaster operable to broadcast the image data as a one-way, non-interactive conveyance of the data for receipt by a variable number of observer apparatus.

36. An apparatus according to claim 35, wherein the data broadcaster is operable to address the image data to particular observer apparatus and to broadcast the image data thereto.

37. A computer instruction carrier medium, carrying instructions for programming a programmable processing apparatus to become operable to:
process stored game data in accordance with instructions received from a plurality of game players to control objects in the game; and
process the stored game data to generate a sequence of images of the progressing game from at least one view, and to broadcast the image data as a one-way, non-interactive conveyance of data for receipt by a variable number of observer apparatus.

38. A computer instruction carrier medium according to claim 37, wherein the medium comprises a signal.

39. A system for playing a computer game, comprising a plurality of player apparatus for the input of user instructions and at least one game processing apparatus storing data defining a 3D game environment, wherein the player apparatus and the game processing apparatus are connected and information is transferred to enable each player to view the status of the 3D game environment and to control one or more objects therein, and wherein the system further comprises broadcast means for broadcasting data defining at least one view of the 3D game environment for receipt by a plurality of observers, wherein
each player apparatus includes a game processing apparatus storing data defining the 3D game environment,
including a game processing apparatus having the form of a server to which each player apparatus is connected,
each player apparatus is operable to send instructions to the server to change the 3D game environment stored therein in accordance with inputs from a user at the player apparatus; and
the server is operable to send data defining the status of the game environment to each player apparatus.

40. A system according to claim 39, wherein there is a game processing apparatus having the form of a server to which each player apparatus is connected, and wherein object control signals are sent from the player apparatus to the game processing apparatus and information defining the status of the game environment is sent from the game processing apparatus to the player apparatus.

41. A system according to claim 39, wherein each player apparatus includes a game processing apparatus, and wherein each player apparatus sends information to the other player apparatus defining changes made to the game environment by the player at the apparatus which sends the information.

42. A system according to claim 39, wherein the broadcast means is arranged to address the data defining the at least one view of the 3D game environment to particular observers and to broadcast the data thereto.

43. In a computer game processing system comprising at least one three-dimensional computer game processing apparatus, a plurality of player apparatus in communication with the at least one computer game processing apparatus, and a plurality of observer apparatus, a method of performing processing to enable the players to play the computer game and to enable the observers to observe the game as it is played, the method comprising the steps of:
transmitting data between the at least one game processing apparatus and the plurality of player apparatus, and between the plurality of player apparatus and the at least one game processing apparatus, to enable the players to play the game and to view the game as it is played;
generating image data defining images of the game as it evolves during play and broadcasting the image data for receipt by the plurality of observer apparatus, thereby enabling the observer apparatus to receive the image data as a one-way, non-interactive conveyance of data; and
receiving the broadcast image data at the plurality of observer apparatus and displaying the image data to the observers.

44. A method according to claim 43, further comprising increasing the number of observer apparatus which receive the broadcast image data without changing the processing burden to generate the broadcast data.

45. A method according to claim 43, wherein the broadcast image data is addressed to a particular observer apparatus.

46. A computer game processing system operable to process data defining a three-dimensional computer game in accordance with instructions from a plurality of game players and to generate data to enable a plurality of non-playing observers to observe the playing of the game, the system comprising:
at least one game processing apparatus storing data defining a three-dimensional computer graphics computer game;
a plurality of player apparatus, each player apparatus being operable to receive inputs from a respective player defining game control instructions;
at least one data communication link connecting the game processing apparatus and the plurality of player apparatus to allow the transfer of data therebetween, wherein
the game processing apparatus and the plurality of player apparatus are operable to exchange data via the at least one communication link to enable the players to play the game; and
the system further comprises:
a broadcast data generator operable to generate image data defining images to enable a plurality of observers to observe the playing of the game by the players and to broadcast the image data as a one-way, non-interactive conveyance of data; and
a plurality of observer apparatus, each observer apparatus being arranged to receive and display the image data broadcast by the broadcast data generator.

47. A system according to claim 46, wherein the broadcast data generator is operable to address the image data to particular observer apparatus and to broadcast the image data thereto.

* * * * *

UNITED STATES PATENT AND TRADEMARK OFFICE
CERTIFICATE OF CORRECTION

| | | |
|---|---|---|
| PATENT NO. | : 7,176,920 B1 | |
| APPLICATION NO. | : 09/411389 | |
| DATED | : February 13, 2007 | |
| INVENTOR(S) | : Adam Billyard et al. | |

It is certified that error appears in the above-identified patent and that said Letters Patent is hereby corrected as shown below:

<u>COLUMN 12</u>:

Line 24, "date" should read --data--.

Signed and Sealed this

First Day of July, 2008

JON W. DUDAS
*Director of the United States Patent and Trademark Office*